US010725533B2

(12) United States Patent
Iyer et al.

(10) Patent No.: US 10,725,533 B2
(45) Date of Patent: Jul. 28, 2020

(54) SYSTEMS, APPARATUSES, AND METHODS FOR GESTURE RECOGNITION AND INTERACTION

(71) Applicant: Intel Corporation, Santa Clara, CA (US)

(72) Inventors: Ravishankar R. Iyer, Portland, OR (US); Omesh Tickoo, Portland, OR (US); Glen J. Anderson, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 653 days.

(21) Appl. No.: 14/498,704

(22) Filed: Sep. 26, 2014

(65) Prior Publication Data

US 2016/0091964 A1 Mar. 31, 2016

(51) Int. Cl.
*G06F 3/01* (2006.01)
*G06K 9/00* (2006.01)
(Continued)

(52) U.S. Cl.
CPC ............ *G06F 3/011* (2013.01); *G02B 27/017* (2013.01); *G06F 3/017* (2013.01); *G06F 3/0484* (2013.01); *G06F 3/04842* (2013.01); *G06K 9/00355* (2013.01); *G06K 9/00671* (2013.01); *G06K 9/46* (2013.01); *G06K 9/6202* (2013.01);
(Continued)

(58) Field of Classification Search
CPC ........ G06F 3/017; G06F 3/0178; G06F 3/011; G06F 3/04815; G02B 2027/014; G02B 2027/017; G02B 2027/0138
See application file for complete search history.

(56) References Cited

U.S. PATENT DOCUMENTS 6,647,500 B1  11/2003  Kwong
8,180,114 B2   5/2012  Nishihara et al.
(Continued)

FOREIGN PATENT DOCUMENTS

CN    104541232 A    4/2015
CN    106575043 A    4/2017
(Continued)

OTHER PUBLICATIONS

D. Jawalebhoi, "List of Common Password Reset/Challenge Questions," published Jul. 14, 2008, downloaded from http://curiousdeveloper.blogspot.com/2008/07/list-of-common-password-resetchallenge.html.*

(Continued)

*Primary Examiner* — Jennifer N To
*Assistant Examiner* — Eric J Yoon
(74) *Attorney, Agent, or Firm* — Schwegman Lundberg & Woessner, P.A.

(57) ABSTRACT

Generally discussed herein are systems and apparatuses for gesture-based augmented reality. Also discussed herein are methods of using the systems and apparatuses. According to an example a method may include detecting, in image data, an object and a gesture, in response to detecting the object in the image data, providing data indicative of the detected object, in response to detecting the gesture in the image data, providing data indicative of the detected gesture, and modifying the image data using the data indicative of the detected object and the data indicative of the detected gesture.

20 Claims, 7 Drawing Sheets

(51) Int. Cl.
*G06F 3/0484* (2013.01)
*G06K 9/62* (2006.01)
*G06K 9/46* (2006.01)
*G02B 27/01* (2006.01)
*G06F 1/16* (2006.01)

(52) U.S. Cl.
CPC .............. *G02B 2027/014* (2013.01); *G02B 2027/0138* (2013.01); *G02B 2027/0178* (2013.01); *G02B 2027/0187* (2013.01); *G06F 1/163* (2013.01); *G06F 2203/04806* (2013.01); *G06K 9/00684* (2013.01)

(56) References Cited

U.S. PATENT DOCUMENTS

| | | | | |
|---|---|---|---|---|
| 8,400,548 B2 * | 3/2013 | Bilbrey | ............... | G06F 1/1694 348/333.01 |
| 8,405,680 B1 * | 3/2013 | Cardoso Lopes | ....... | G06T 19/00 345/426 |
| 8,812,419 B1 * | 8/2014 | Teller | ................... | G06Q 10/10 706/46 |
| 8,873,147 B1 * | 10/2014 | Rhodes | ............ | G02B 27/0172 359/630 |
| 2007/0219792 A1 * | 9/2007 | Normandin | ............ | G10L 15/26 704/239 |
| 2010/0199232 A1 | 8/2010 | Mistry et al. | | |
| 2013/0021374 A1 * | 1/2013 | Miao | ...................... | G06F 3/011 345/633 |
| 2013/0307875 A1 | 11/2013 | Anderson | | |
| 2013/0346168 A1 | 12/2013 | Zhou et al. | | |
| 2014/0071041 A1 | 3/2014 | Fujimaki | | |
| 2014/0092014 A1 | 4/2014 | Srinivasan et al. | | |
| 2014/0225918 A1 | 8/2014 | Mittal et al. | | |
| 2014/0328517 A1 * | 11/2014 | Gluncic | ................. | G06K 9/00 382/103 |
| 2015/0059002 A1 * | 2/2015 | Balram | ................... | G06F 3/011 726/28 |
| 2015/0309316 A1 * | 10/2015 | Osterhout | ............... | G06F 1/163 345/8 |
| 2016/0026253 A1 * | 1/2016 | Bradski | ................ | G02B 27/225 345/8 |
| 2016/0034254 A1 * | 2/2016 | LeBeau | .................. | G06F 3/167 704/275 |

FOREIGN PATENT DOCUMENTS

| | | |
|---|---|---|
| CN | 106575043 B | 11/2019 |
| EP | 2813069 A1 | 12/2014 |
| WO | WO-2013119221 A1 | 8/2013 |
| WO | WO-2013155217 A | 10/2013 |
| WO | WO-2014052058 A1 | 4/2014 |
| WO | WO-2014147686 A1 | 9/2014 |

OTHER PUBLICATIONS

"International Application Serial No. PCT/US2015/048658, International Search Report dated Dec. 15, 2015", 3 pgs.
"International Application Serial No. PCT/US2015/048658, Written Opinion dated Dec. 15, 2015", 9 pgs.
"International Application Serial No. PCT/US2015/048658, International Preliminary Report on Patentability dated Apr. 6, 2017", 11 pgs.
"Chinese Application Serial No. 201580045628.6, Office Action dated Apr. 1, 2019", with English translation of claims, 12 pgs.
"Chinese Application Serial No. 201580045628.6, Office Action dated Aug. 15, 2018", with English translation of claims, 7 pgs.
"Chinese Application Serial No. 201580045628.6, Response filed Jun. 13, 2019 to Office Action dated Apr. 1, 2019", w/ English claims, 10 pgs.
"Chinese Application Serial No. 201580045628.6, Response Filed Dec. 28, 2018 to Office Action dated Aug. 15, 2018", w/English Claims, 9 pgs.
"European Application Serial No. 15843994.3, Communication Pursuant to Article 94(3) EPC dated Feb. 7, 2020", 4 pgs.
"European Application Serial No. 15843994.3, Extended European Search Report dated Aug. 6, 2018", 11 pgs.
"European Application Serial No. 15843994.3, Partial Supplementary European search report dated May 2, 2018", 12 pgs.
"European Application Serial No. 15843994.3, Response filed Mar. 1, 2019 to Extended European Search Report dated Aug. 6, 2018", 14 pgs.

* cited by examiner

SYSTEMS, APPARATUSES, AND METHODS FOR GESTURE RECOGNITION AND INTERACTION

TECHNICAL FIELD

Examples generally relate to gesture recognition and more specifically to gesture recognition and interaction using a wearable device.

TECHNICAL BACKGROUND

Augmented reality (AR) includes a presentation of a real world image or image stream that is augmented (e.g., modified, altered, or amended) with a sensory output such as a sound or visual augmentation. Augmenting image data is generally done in real-time. In general, AR supplants a real world view that is captured, processed, and output to provide a simulated view. AR has many applications including gaming, maintenance, entertainment, directions, and guidance, among others.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed herein.

DESCRIPTION OF EMBODIMENTS

Discussed generally herein are systems, devices, and methods for AR and associated AR user interactions. Embodiments discussed herein may be implemented using a wearable display, such as a head-wearable display, or in connection with other AR-capable computing device (e.g., mobile computing devices, such as smartphones).

As described herein, various mechanisms of AR user interactions may be provided through the use of an AR device having a camera and a display. One way of interacting with a body-mounted camera is for a wearable device to use machine-vision to detect a user's finger or hand gesture that may be interpreted as a command A gesture (e.g., air gesture) in front of a wearable camera combined with object recognition may provide a variety of usage models and applicability to AR applications.

The wearable device generally includes an image (e.g., video) capturing mechanism, such as a camera, and an output device to display a captured image to a user. The image capture device may be mounted so that the user wearing the image capture device may perform a gesture between a lens of the image capture device and an object that is a subject of the gesture. The gesture and the object may be recognized by the device. The gesture may cause the device to augment image data captured by the camera based on a variety of data, such as the gesture, object, a social context, a spoken sound, a gesture-selected operation, or a combination thereof, among others.

Reference will now be made to the FIGS. to further describe details of systems, apparatuses, and methods for AR.

Figure 1:
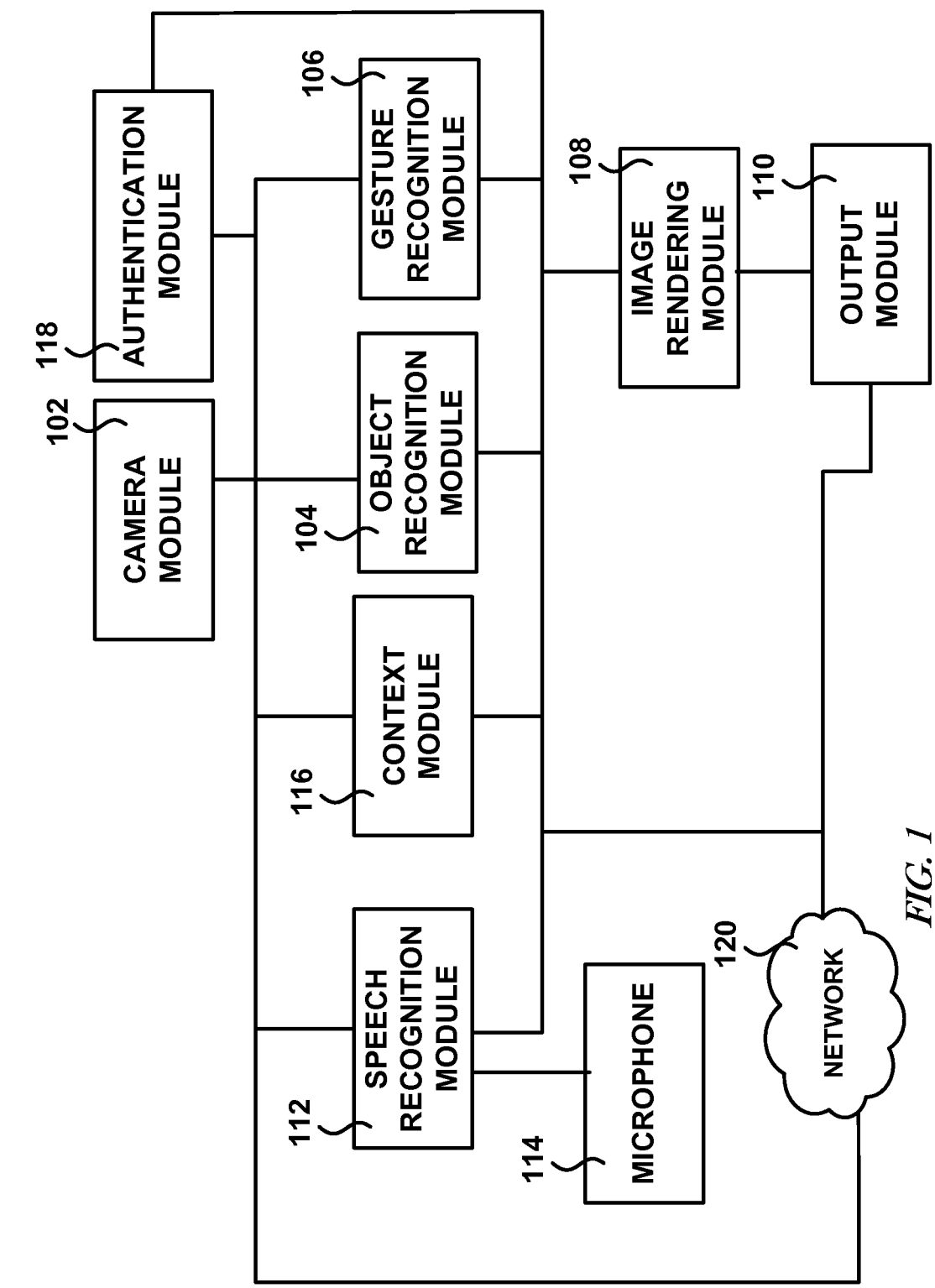
FIG. 1 shows a block diagram of an example of an AR system, in accord with one or more embodiments.

FIG. 1 shows an example of an AR system 100, in accord with one or more embodiments. The AR system 100 may include a camera module 102, an object recognition module 104, a gesture recognition module 106, an image rendering module 108, and an output module 110.

The camera module 102 may translate a scene in a field of view of the camera module 102 into image data (e.g., video, still, or other image data). The camera module 102 may include a digital camera, video camera, camera phone, or other image capturing device.

The object recognition module 104 may detect or recognize (e.g., detect and identify) an object in the image data. The object recognition module 104 may delineate (e.g., extract) an object from the image data, such as to isolate the object from the surrounding environment in the field of view of the camera module 102 or in the image data. The object recognition module 104 may use at least one of an appearance-based method or feature-based method, among other methods, to detect, recognize, or delineate an object.

The appearance-based method may include generally comparing a representation of an object to the image data to determine if the object is present in the image. Examples of appearance-based object detection methods include an edge matching, gradient matching, color (e.g., greyscale) matching, "divide-and-conquer", a histogram of image point relations, a model base method, or a combination thereof, among others. The edge matching method may include an edge detection method that includes a comparison to templates of edges of known objects. The color matching method may include comparing pixel data of an object from image data to previously determined pixel data of reference objects. The gradient matching method may include comparing an image data gradient to a reference image data gradient. The "divide-and-conquer" method may include comparing known object data to the image data. The histogram of image point relations may include comparing relations of image points in a reference image of an object to the image data captured. The model base method may include comparing a geometric model (e.g., eigenvalues, eigenvectors, or "eigenfaces", among other geometric descriptors) of an object, such as may be stored in a model database, to the image data. These methods may be combined, such as to provide a more robust object detection method.

The feature-based method may include generally comparing a representation of a feature of an object to the image data to determine if the feature is present, and inferring that the object is present in the image data if the feature is present. Examples of features of objects include a surface feature, corner, or edge shape. The feature-based method may include a Speeded Up Robust Feature (SURF), a Scale-Invariant Feature Transform (SIFT), a geometric hashing, an invariance, a pose clustering or consistency, a hypothesis and test, an interpretation tree, or a combination thereof, among other methods.

Delineating an object may include determining an outline or silhouette of an object and determining image data (e.g., pixel values) within the outline or silhouette. The determined image data or pixel values may be displayed or provided without displaying or providing the remaining image data of the image the object was delineated from. The delineated object may be displayed over a still image or otherwise displayed using the output module 110. A user may cause one or more operations to be performed on an object by performing a gesture or command while the still image is being displayed. More details regarding examples of these operations are discussed with regard to FIG. 4.

The gesture recognition module 106 may identify a hand or finger in image data (e.g., image data corresponding to a single image or image data corresponding to a series of images or multiple images) and determine its motion or configuration to determine if a recognizable gesture has been performed. The gesture recognition module 106 may process gestures that are on-line or off-line. An on-line gesture is generally a direct manipulation gesture that is used to modify an object, whereas an offline gesture is a gesture that is processed after an interaction with an object (e.g., activating a menu screen).

The gesture recognition module 106 may use a three-dimensional or two-dimensional recognition method. Generally, a two-dimensional recognition method requires fewer computer resources to perform gesture recognition than a three-dimensional method. The gesture recognition module 106 may implement a skeletal-based method or an appearance-based method, among others. The skeletal-based method includes modeling a finger or hand as one or more segments and one or more angles between the segments. The appearance-based model includes using a template of a hand or finger and comparing the template to the image data to determine if a hand or finger substantially matching the template appears in the image data.

The image rendering module 108 may modify the image data, such as to augment the image data and provide an AR image. The image rendering module 108 may alter the image data based on data from the object recognition module 104, the gesture recognition module 106, a speech recognition module 112, a context module 116, or an authentication module 118. FIGS. 4, 6, 7B and 8 show examples of a variety of image augmentations, such as may be performed by the image rendering module 108.

The output module 110 may include a speaker, a radio (e.g., Bluetooth, cellular, or other radio) receiver, transmitter, or transceiver, a display, projector, or other device. The output module 110 can be operable to provide a view of an image captured by the camera module 102 or a view of an augmented image corresponding to augmented image data, such as may be provided by the image rendering module 108. The output module 110 may include a Liquid Crystal Display (LCD), a Light Emitting Diode (LED), a plasma display, a touch screen display, or a projector or screen, among others.

The speech recognition module 112 may interpret a sound (e.g., a word or phrase) captured by a microphone 114 and provide data indicative of the interpretation. The sound may be interpreted using a Hidden Markov Model (HMM) method or a neural network method, among others.

The context module 116 may determine a user's social circumstance and provide data indicative of the user's determined social circumstance. Examples of social circumstances may include a user exercising, conversing, driving, shopping, eating, watching a program (e.g., a movie, television, or other program), working, visiting a person, place, or thing, among others. The social circumstance of the user may be determined based on at least one of a location, speed, or direction of the user, one or more people or objects in the image data, a date or time of day, or an application state of an application running on the user's wearable device.

In one or more embodiments, if the location of the user is a coffee shop or other social situation, voice commands (e.g., the speech recognition module 112 or microphone 114) may be disabled. In one or more embodiments, if the user is traveling within a first range of speeds, the user may be determined to be walking or running. If another person's voice is consistently being picked up by the microphone, the user may be determined to be conversing with another person or listening to another person's voice. In one or more embodiments, a combination of a location and a person or object may indicate that a user is visiting a friend or family member.

The authentication module 118 may provide a security mechanism for the system 100. The authentication module 118 may include a policy that defines a set of one or more operations that are required to be performed for a user to access functionality of one or more modules of the system 100. An example of an authentication method and an example of the functionality provided by the authentication module 118 is discussed with regard to FIG. 6. The authentication module 118 can provide a secure path that can help protect the system 100 from a malicious attack. In one or more embodiments, the authentication module 118 can include the functionality of the object recognition module 104, the gesture recognition module 106, the speech recognition module 112, or the context module 108. In one or more embodiments, the authentication module 118 can receive data produced by object recognition module 104, the gesture recognition module 106, the speech recognition module 112, or the context module 108 and compare the data to the policy to determine if the policy has been satisfied.

The system 100 may include a wired or wireless connection to a network 120 (e.g., the internet or a cellular or WiFi network, among others). The network 120 may provide data that may be provided to a user, such as through the output module 110. For example, the network 120 may provide directions, data about an object in the image data, an answer to a question posed through the speech recognition module 112, an image (e.g., video or series of images) requested, or other data.

In one or more embodiments that include a radio, a user may perform a gesture (or voice command) that causes the radio to transmit a signal that calls another device. In one or more embodiments, a user may perform a gesture (or voice command) that causes the radio to transmit a signal that turns on a device that appears in the field of view of the camera. The device may be associated with an object (e.g., a person) recognized in image data.

In one or more embodiments, a gesture may cause different commands to be performed on image data based on a recognized object. For example, an underline gesture near a text object may cause the text to be underlined, and an underline gesture near another object may cause the object to be highlighted. In other examples a box gesture around an object may cause a framed or cropped image of the object to be displayed depending on the object and a point gesture to a distant recognized object may cause additional information regarding the recognized object like distance or navigation information to be displayed depending on the object.

In one or more embodiments, a user may name an object or face using their voice or a gesture. For example, the user may point to one of multiple people or objects and say a name. Subsequently, the face may be recognized with that name label and any associated data to that label. Contextual information (e.g., as determined by the context module 116) may help narrow the number of possible labels, both during training and during recognition. For example, items in a kitchen may be labeled while the user is cooking, but if the user goes to the refrigerator to get a drink or a snack, the labels may remain hidden from the user's view.

In one or more embodiments, the system 100 may apply a tag or other information that may be used to provide a suggestion or recommendation to the user. For example, a gestures or voice command may be used as a "context" tag to indicate which image data includes useful information for the user. For example, a user might point to an object (as in FIG. 3) and say "remember this". This gesture or voice command may be used as a contextual tag for searching for content that might be of interest to the user.

In one or more embodiments, a user may perform a gesture proximate to an object (or speak a voice command) that causes the camera module 102 to begin recording or provide a live video feed focused on an object in the field of view of the camera module 102. The camera module 102 may auto-focus on the object so as to provide a clear(er) view of the object or a recorded video that may be accessed by the user. The user may stop the camera module 102 recording or live video feed with another gesture (e.g., the same gesture) or voice command.

In one or more embodiments, the object recognition module 104 may recognize multiple objects in a given scene and the user may perform a gesture recognized by the gesture recognition module 106 that causes the image rendering module 108 to perform an operation on one or more of the multiple recognized objects. In one or more embodiments, a device gesture (e.g., a head motion or other bodily motion that moves a wearable device, a touchscreen input, or other input), may be used in lieu of or in combination with one or more gestures to provide a command to the image rendering module 108 that causes the image rendering module 108 to perform an operation on the image data.

Figure 2:
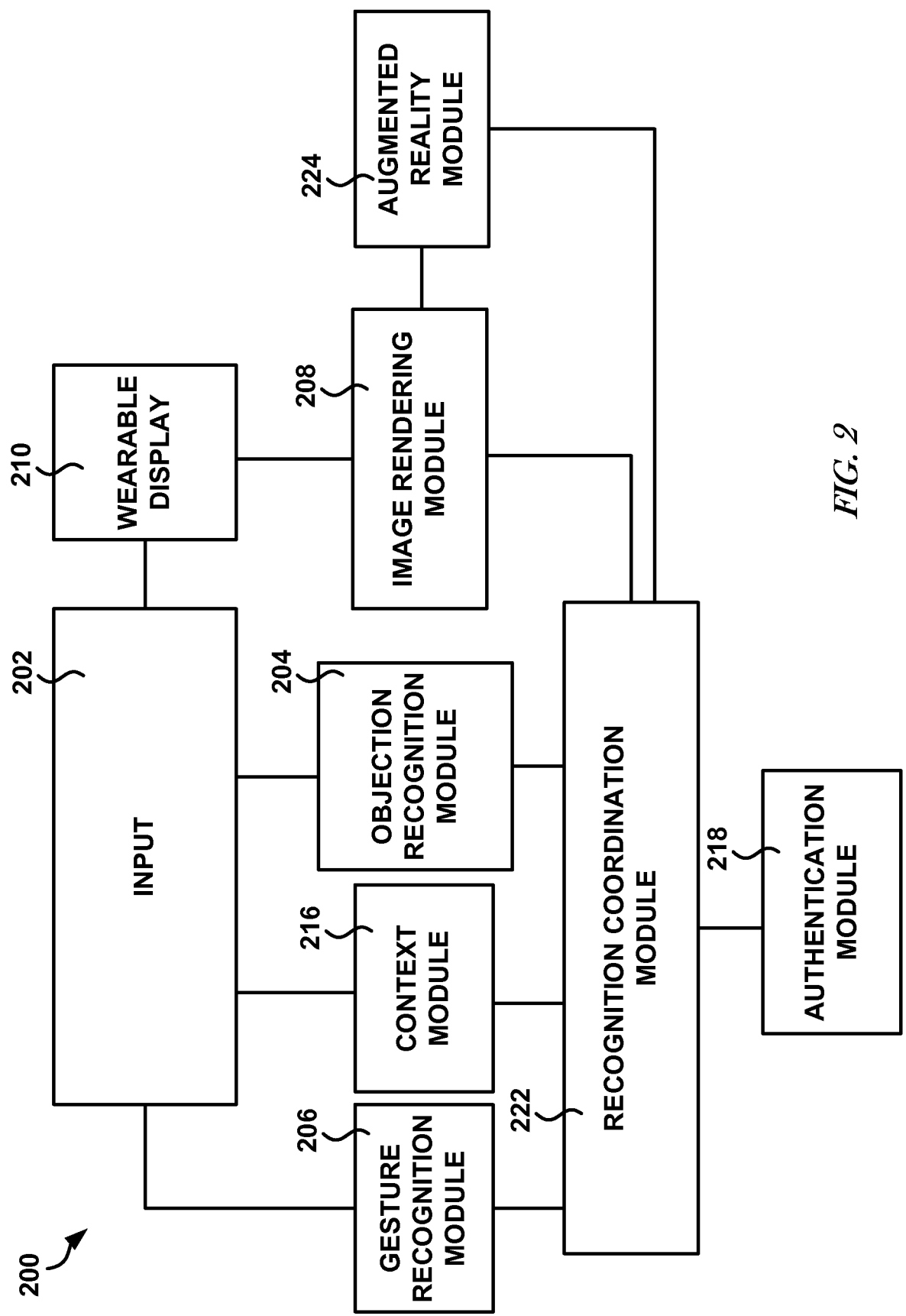
FIG. 2 shows a block diagram of another example of an AR system, in accord with one or more embodiments.

FIG. 2 shows another example of an AR system 200, in accord with one or more embodiments. The AR system 200 may include one or more modules that may be used in place of, or in conjunction with, one or more modules of the AR system 100. The system 200 may include an input 202, an object recognition module 204, a gesture recognition module 206, an image rendering module 208, a wearable display 210, a context module 216, an authentication module 218, a recognition coordination module 222, and an AR module 224.

The input 202 may include microphone data, camera data, touch screen data, radio data, capacitive surface data, or other input. A user may touch a capacitive surface to issue a command to a module of the system 200, such as to make the system 200 store an image to a local memory or the network 120, or to make the system 200 perform an operation, as discussed herein.

The object recognition module 204 may be similar to the object recognition module 104, and may include the capability to perform the same operations as the objection recognition module 104 and vice versa. The gesture recognition module 206 may be similar to the gesture recognition module 106, such as to include the capability to perform the same operations as the gesture recognition module 106 and vice versa. The context module 216 may be similar to the context module 116, such as to include the capability to perform the same operations as the context module 116 and vice versa. The authentication module 218 may be similar to the authentication module 118, and may include the capability to perform the same operations as the authentication module 118 and vice versa. The image rendering module 208 may be similar to the image rendering module 108, and may include the capability to perform the same operations as the image rendering module 108 and vice versa.

The recognition coordination module 222 may receive data from and coordinate communication or task management between the object recognition module 206, gesture recognition module 206, context module 216, and authentication module 218. The recognition coordination module 222 may provide data to the image rendering module 208 and the AR module 224. The data may indicate an action to be performed by the AR module 224 or the image rendering module 208. The data may indicate to the image rendering module 208 or the AR module 224 what image data to modify or transmit to the wearable display 210.

The recognition coordination module 222 may provide a command associated with a recognized gesture, an authentication attempt, or a voice command to be executed (e.g., by the AR module 224 or the image rendering module 208) on a recognized object. The command may be dependent on one or more variables such as a user's social circumstance as determined by the context module 216, a recognized object, a recognized gesture, a recognized voice command, or a result of an authentication attempt as determined by the authentication module 218. For example, if a first gesture (or voice command) is recognized, and the gesture is performed proximate to (or the voice command targets) a first recognized object (e.g., from the viewpoint of a user viewing the wearable display 210 or the output module 110) a first command may be provided. If the same gesture (or voice command) is recognized, and the gesture is performed proximate (or the voice command targets) a second recognized object a second command, different from the first command may be provided. Thus, the command provided may be dependent on the recognized object.

In another example, if a first gesture (or voice command) is recognized, and the gesture is performed proximate (or the voice command targets) a first recognized object and the context module 216 determines the user is in a first social circumstance, a first command (or no command) may be provided. If the same gesture (or voice command) is recognized, the gesture is performed proximate (or targets) the same recognized object, and the context module 216 determines the user is in a second social circumstance different from the first social circumstance, a second command (or no command), different from the first command may be provided. Thus, the command executed may be dependent on the social circumstance as determined by the context module 216.

In yet another example, a gesture performed during an authentication process may cause the recognition coordination module 222 to provide a different command than if the gesture is performed outside of the authentication process.

The AR module 224 may create a model of image data that may be rendered by the image rendering module 208. The model created may be based on the command provided by the recognition coordination module 222, the object recognition module 204, the gesture recognition module 206, the speech recognition module 112, the context module 216, or the authentication module 218.

The image rendering module 208 may create image data to be presented on the wearable display 210. The image rendering module 208 may receive parameters defining an image or a portion of an image, such as a geometric shape, lighting, shading, viewpoint, location, size, or texture data, and produce image data including those parameters. The image rendering module 208 may provide un-augmented image data corresponding to an image captured by the input 202 or augmented image data corresponding to an image captured by the input 202 and augmented in accord with a model, such as may be provided by the AR module 224.

The wearable display 210 may include a device operable to provide a view of an image captured by the input 202 or provided by the image rendering module 208. The wearable display 210 may include a body mountable structure with a display or projector affixed or attached thereto. The wearable display 210 may be configured to be worn on the head, a shoulder, arm, wrist, or other part of a user that allows a user to wear the display and visualize the display simultaneously.

Note that the functionality discussed with regard to a specific module may be implemented by another module. For example, the functionality provided by the recognition coordination module 222 may be performed by the image rendering module 108 or the network 120. Similarly, the functionality provided by the augmented reality module 224 may be provided by the image rendering module 108 or the network 120. Other functionality discussed with regard to the modules of FIGS. 1 and 2 may be performed by other modules of FIGS. 1 and 2.

Figure 3:
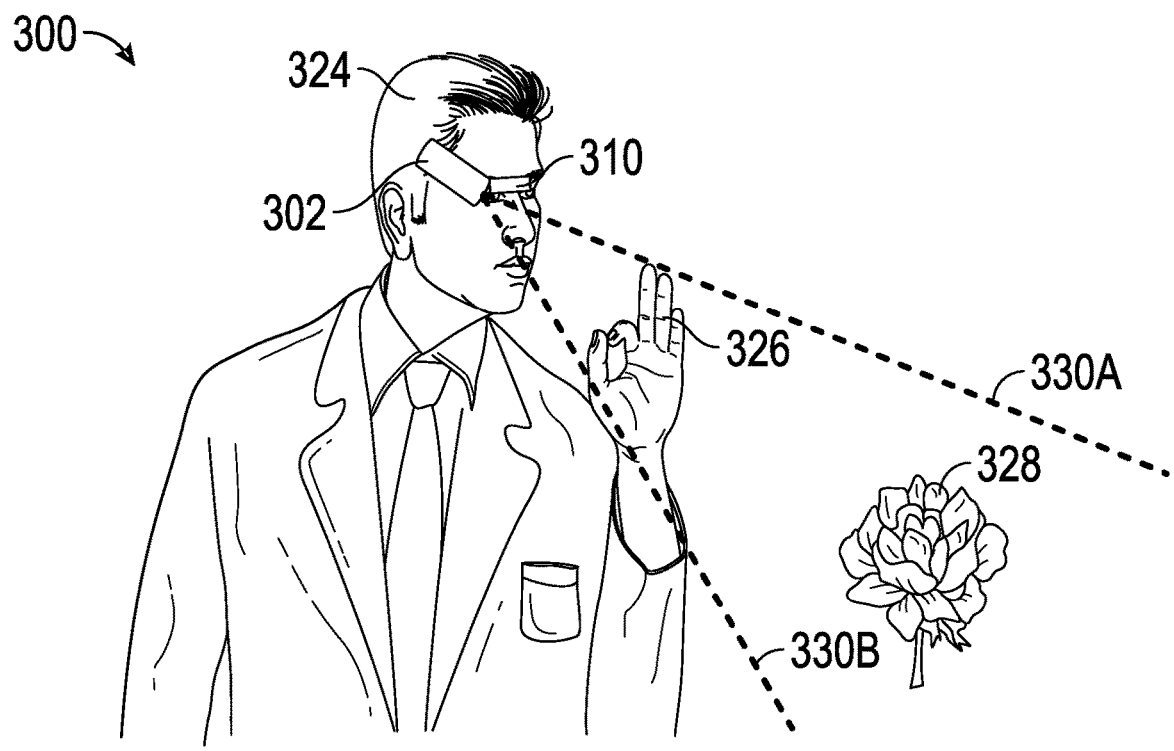
FIG. 3 shows an example of a wearable display in use, in accord with one or more embodiments.

FIG. 3 shows an example of a wearable display system 300 in use, in accord with one or more embodiments. The wearable display system 300 may include a camera 302 and a display 310 that may be worn by a user 324. The camera 302 may be similar to the camera module 102, or the display 310 may be an example of the output module 110. The user 324 may perform a gesture with their hand 326, finger, or an object in a field of view of the camera 302. The field of view of the camera 302 of FIG. 3 is between the dotted lines 330A and 330B. The gesture performed by the user 324 may generally be performed within a field of view of the camera 302 that is in a location between a camera lens and an object 328.

The gesture may include the user 324 performing a sweeping motion (e.g., a continuous motion from a point in the field of view to another point in the field of view), configuring one or more fingers in a specific shape (e.g., a sign language letter, word, or phrase, among other shapes), increasing or decreasing a distance between two fingers, pointing with one or more fingers, performing a tapping motion with one or more fingers, or a combination thereof, among other gestures. Note that, as discussed, the gesture may be performed using a finger, hand, or object in the field of view of the camera.

In one or more embodiments, the recognized gesture, such as may be recognized using the gesture recognition module 106, may cause an operation to be performed on an object in the image data. Note that the object may be recognized (e.g., by the object recognition module 104) before or after the gesture is performed or recognized. In one or more embodiments, the recognized gesture may be performed in the field of view of the camera 302 not proximate to an object, such as to cause the image rendering module 108 or 208 to perform a different command, such as displaying a menu of options to the user (e.g., overlaid on image data from an image-capturing device). A gesture directed at an object (e.g., an object that highlighted or otherwise indicated as being selected) may cause an operation to be performed on a device or data representative of the object. For example, if a selected object includes a vehicle, such as a vehicle that is the user's vehicle or a vehicle that the user controls, and the user directs an appropriate gesture or voice command toward the vehicle, the vehicle may be started. This may be accomplished using a subsystem in the system 100 or 200 that may issue a command to the vehicle.

Figure 4:
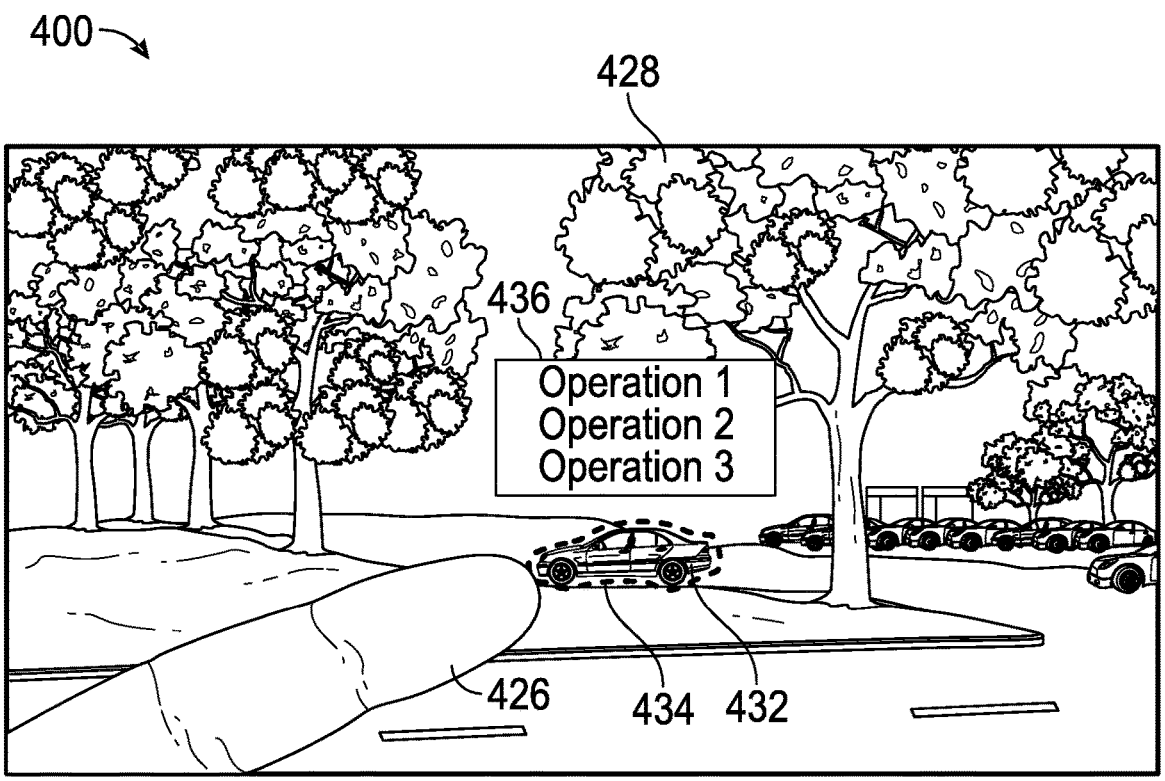
FIG. 4 shows an example of an AR use case, in accord with one or more embodiments.

FIG. 4 shows an example of an AR system use case 400, in accord with one or more embodiments. The images shown in FIGS. 4-8 generally show a view of a scene as may be presented on the output module 110, or the wearable display 210 or 310. In the use case 400, a user may perform a gesture proximate a recognized object (e.g., "proximate" is in terms of where the object and the gesture appear on an output image displayed to the user using the output module 110 or the wearable display 210 or 310). In the example of FIG. 4, the gesture includes pointing at an object in the displayed image data. The gesture may cause a command to be issued (e.g., by the recognition coordination module 222, gesture recognition module 106, or other module) that causes the object to be highlighted, outlined, pointed to, have its corresponding pixel values altered so as to make the object standout in the displayed view of the scene, or otherwise augmented, such as to alert the user that the object is selected. In one or more embodiments, the recognized gesture may cause a still image that includes the selected object to be displayed to the user. In one or more embodiments, the recognition coordination module 222 or the object recognition module 204 may issue a command to the image rendering module 208 that causes the image rendering module 208 to render a still image to the wearable display 210.

While the still image is being displayed, the input 202 may continue to capture image data. The object recognition module 204 may delineate a hand, finger, or object (e.g., an object being manipulated by the user) from the captured image data. The wearable display 210 may display the delineated hand, finger, or object over the still image. The image rendering module 208 may cause the wearable display 210 to display the delineated hand, finger, or object at a location on the image that is relative to the hand, finger, or object location in the field of view of the input 202. This may allow the user to manipulate the still image using gestures while viewing their hand, finger, or object overlaid on the still image.

The gesture recognition module 106 may continue to recognize gestures and provide data indicating a recognized gesture, such as to cause an operation to be performed on the still image. In the example of FIG. 4, the user has performed a gesture proximate the object 432 in the image 428. This gesture has caused the image rendering module 208 to render an image for the wearable display 210 that includes the object 432 outlined with dotted lines 434. The wearable display 210 is displaying the user's finger 426, delineated from other image data by the object recognition module 204 or the image rendering module 208 overlaid on the still image. The gesture recognition module 206 detects that the user is performing a gesture (e.g., pointing in the example of FIG. 4) and has provided data indicative of the gesture. The image rendering module 208 has provided the wearable display 210 with data that causes the wearable display to display a control box 436 of one or more user-selectable operations that may be performed with respect to the object 432.

The operations displayed in the control box 436 may include any operation that may be performed with respect to the object 432 using a gesture or voice command or additional operations that may be performed on an image representation of the object 432. For example, an operation that may be performed on the image representation of the object 432 may include shrinking, enlarging, altering a color, intensity, or contrast of a at least a portion of the pixels of the image representation of the object 432, naming the object 432, adding a note with respect to the object 432, setting an alert to have the system 100 or 200 indicate to the user when the object (e.g., or an object similar to the object 432) is in the field of view of the camera module 102, displaying information about the object 432, presenting a text box which the user may type in, among other operations.

Figure 5A:
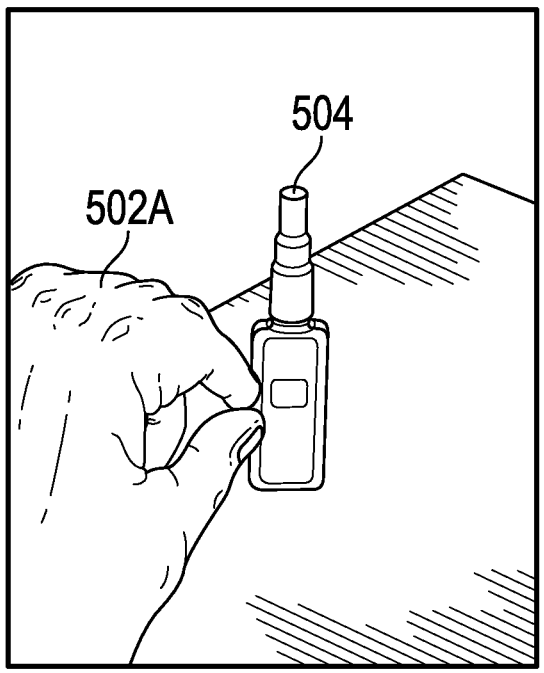
FIGS. 5A and 5B show an example of a series of images showing a gesture and proximate object, in accord with one or more embodiments.
Figure 5B:
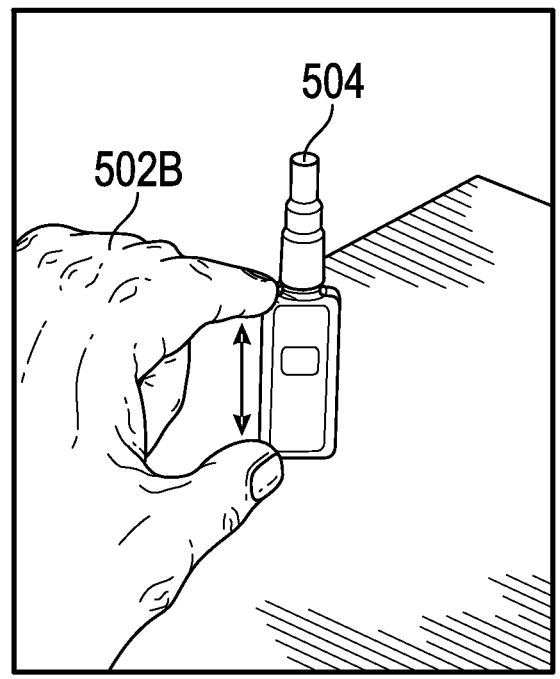

FIGS. 5A and 5B show an example of a series of images 500A and 500B, respectively, of a gesture (indicated by the arrow in FIG. 5B) performed proximate an object 504, in accord with one or more embodiments. In the example of FIGS. 5A-B the gesture may be performed by placing a pointer finger on or near a thumb, such as shown in FIG. 5A, and separating the pointer from the thumb, as shown in FIG. 5B. The gesture in the example of FIGS. 5A-B may cause an operation to be performed on the object 504 (e.g., image data corresponding to the object) or may cause an operation to be performed that relates to the object. For example, the gesture may cause more of the object 504 to be ordered, such as through the network 120. The object recognition module 204 may match a label on the object with a label associated with products that may be ordered and may cause a Web page to be launched, an order form to be presented or prepared, or may cause a confirmation page to be presented to the user. The user may specify a quantity of the product to be ordered (e.g., by performing a gesture command or voice command), a merchant from whom to purchase the product, a payment method, a shipping or billing address, or other information required to finalize the purchase. In another example, the gesture may cause an information lookup, such as to display a product review, instructions or usage information, or the like.

Figure 6:
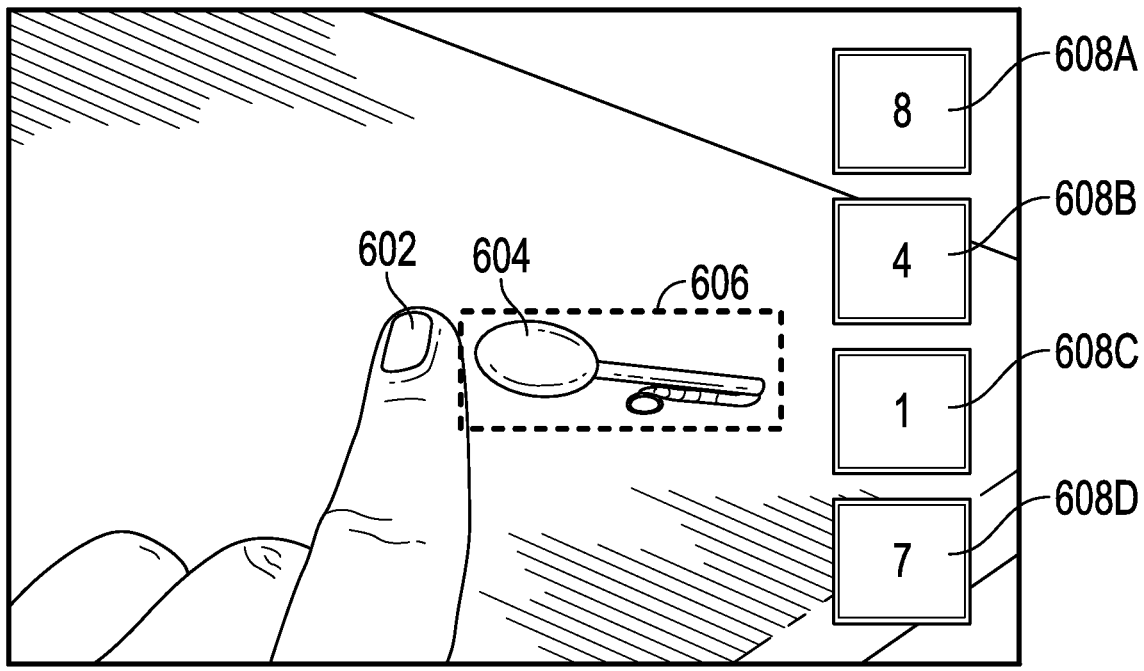
FIG. 6 shows an example of an authentication use case, in accord with one or more embodiments.

FIG. 6 shows an example of an AR image 600 in an authentication user interaction use case, in accord with one or more embodiments. As previously discussed, the authentication module 118 may have access to one or more policies that define a sequence of one or more operations that must be satisfied before a user is provided access to the functionality of the system 100 or 200. In one or more embodiments, the policy may indicate that a user is to perform a gesture to begin an authentication process. In one or more embodiments, a specific object 604, such as may be selected by the user (e.g., in an authentication setup process), may be required to perform an authentication. The user may be required to point to one or more targets 608A, 608B, 608C, or 608D or manipulate the object 604 to contact or point to the one or more targets 608A-D, such as in a specific order. For example, the user may authenticate access to the system 100 or 200 by manipulating the object 604 (e.g., in a specific orientation or range of orientations) to virtually touch one or more of the targets 608A-D in a specific order. The image rendering module 208 may indicate to a user that the authentication object 604 is recognized, such as by augmenting the image of the object or otherwise augmenting the image to indicate to the user the object is recognized as the authentication object. In the example of FIG. 6, the object 604 is outlined in dotted lines 606, such as to indicate to the user that the object 604 is recognized (e.g., by the object recognition module 204 as the authentication object) or that the authentication process has begun or is about to begin. In one or more embodiments, the user may proceed with the authentication process after the user realizes that the authentication object is recognized or the system 100 or 200 otherwise indicates that the system 100 or 200 is ready to begin the authentication process. In one or more embodiments, the user may authenticate using other gesture-based manipulations of the object. For example, the user may circle an identified object a number of times with their finger or hand or perform a gesture that causes an image of the object to turn upside down.

In one or more embodiments, if the authentication process fails (e.g., a predetermined number of times), an alternative authentication process may provide a user an alternative method of gaining access to the functionality of the system 100 or 200. For example, a series of security questions may be posed to a user, which the user may answer using voice commands or by providing data indicating the answer to the security questions. The authentication module 218 may allow a user to access the functionality of the system 100 or 200 in response to the user answering the security questions as detailed in the policy.

Figure 7A:
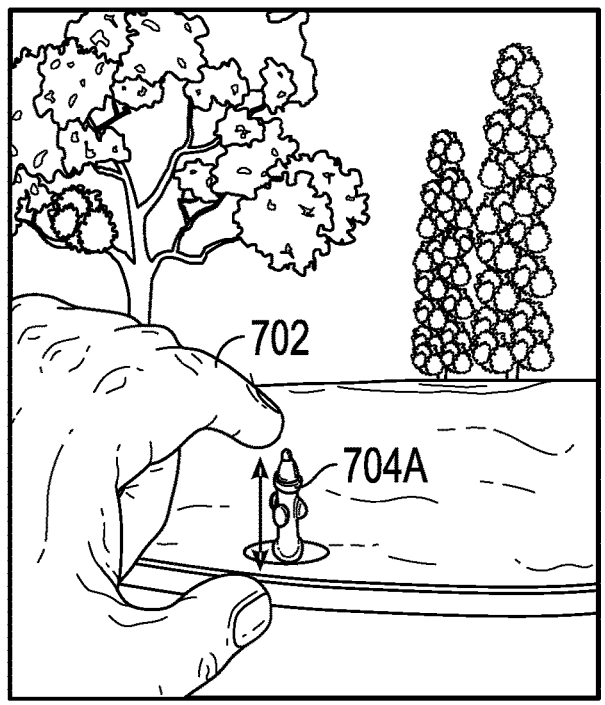
FIGS. 7A and 7B show an example of a series of images showing an object modification use case, in accord with one or more embodiments.
Figure 7B:
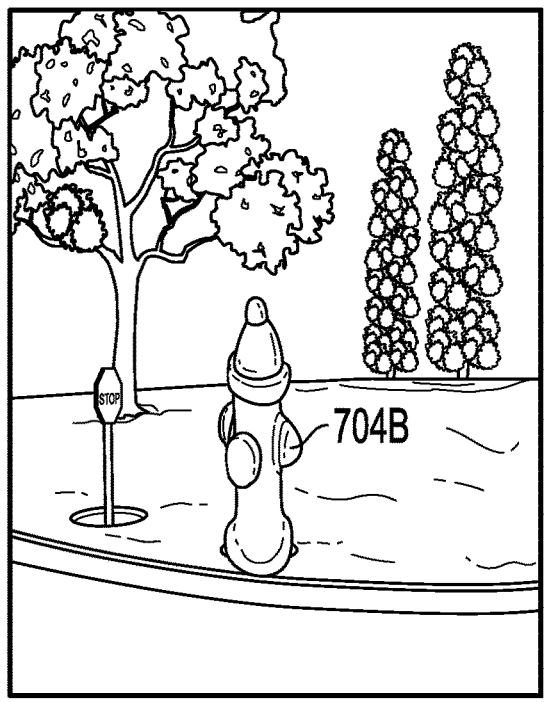

FIGS. 7A and 7B show an example of a series of images 700A and 700B, respectively that depict another object augmentation use case, in accord with one or more embodiments. A user may perform a gesture (e.g., a gesture recognizable by the gesture recognition module 206) with their finger(s), hand(s), or one or more object(s) to cause an object to change in size, shape, color, contrast, intensity, or other appearance characteristic. In the example of FIGS. 7A-B, the user performs a gesture that includes moving the pointer finger of their hand 702 away from the thumb (similar to the gesture depicted in FIGS. 5A-B). The arrows indicate the direction of movement included in the gesture in this example. The gesture, in response to being recognized by the gesture recognition module 206, may cause the image rendering module 208 to augment the image data to be displayed by the wearable display 210. The image 700B may be the result of augmenting the image 700A. The image 700B includes the object 704A from the image 700A enlarged and displayed as the object 704B. Subsequently, another user who views the scene may see this augmented version of the scene, in one or more embodiments.

Figure 8:
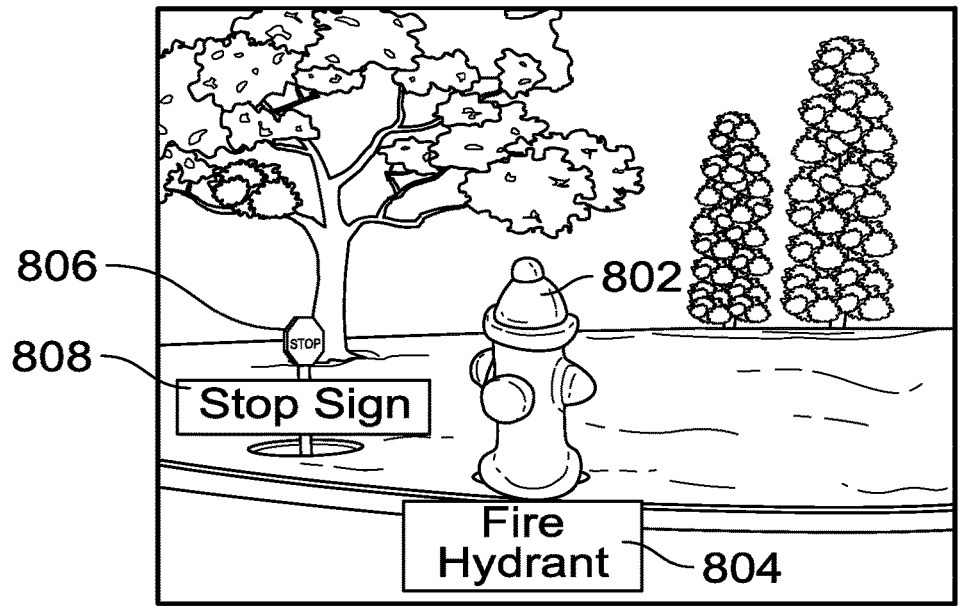
FIG. 8 shows an example of a gesture recognition or speech recognition use case, in accord with one or more embodiments.

FIG. 8 shows an example of an example of an AR image 800 altered using speech or gesture recognition, in accord with one or more embodiments. In one or more embodiments, a user may speak, such as to allow their voice to be picked up by the microphone 114 or the input 202, and their spoken sound(s) may cause the system 100 or 200 to augment an image based on the spoken sound(s).

In one or more embodiments, an operation that may be performed using gesture recognition may be performed or altered through a sound spoken by the user. For example, a user may perform a gesture and at or around the time the gesture is performed, the user may enunciate a sound. The enunciated sound may be associated with an object proximate the performed gesture, such as to cause the image rendering module 208 to associate the announced sound with the object and cause the sound (in text form) to be displayed proximate the object. In another example, an operation caused by a gesture being performed that causes the image rendering module 208 to add text near an object may also be caused to be performed by the user saying the name of the object. In one or more embodiments, a sound spoken at or around a time a user performs a gesture may indicate to the system 100 or 200 which object the gesture is directed at.

In the example of FIG. 8, a user has performed a gesture recognizable by the gesture recognition module 106 proximate the stop sign 806 and spoken the phrase "stop sign" into the microphone 114. The speech recognition module 112 translated the spoken phrase into text and provided data corresponding to the recognized phrase. The image rendering module 208 then caused the wearable display 210 to display the text "stop sign" 808 proximate the stop sign 806. In the future, when an object recognized as a stop sign is within the field of view of the input module 202 or is otherwise to be displayed using the output module 110, a command may be issued that causes the image rendering module 108 to augment the image data to include the text "stop sign" near the object recognized as a stop sign.

In another example, a user has previously indicated to the system 100 or 200 that the object 802 is a "fire hydrant" and the object recognition module 204 causes the image rendering module 208 to label the fire hydrant as a "fire hydrant" whenever a fire hydrant is to be displayed on the wearable display 210. In such a case, where an object is associated with a word or phrase, a user may provide a verbal command to a module of the system 100 or 200 to perform an operation on the object. For example, the user may say "enlarge fire hydrant". This phrase may be recognized by the speech recognition module 212, which may produce data that causes the image rendering module 208 to create an image including the object 802.

Another use case of the system 100 or 200 may include providing a medium through which a user may play a game, such as tag, scavenger hunt, laser tag, or other game.

Figure 9:
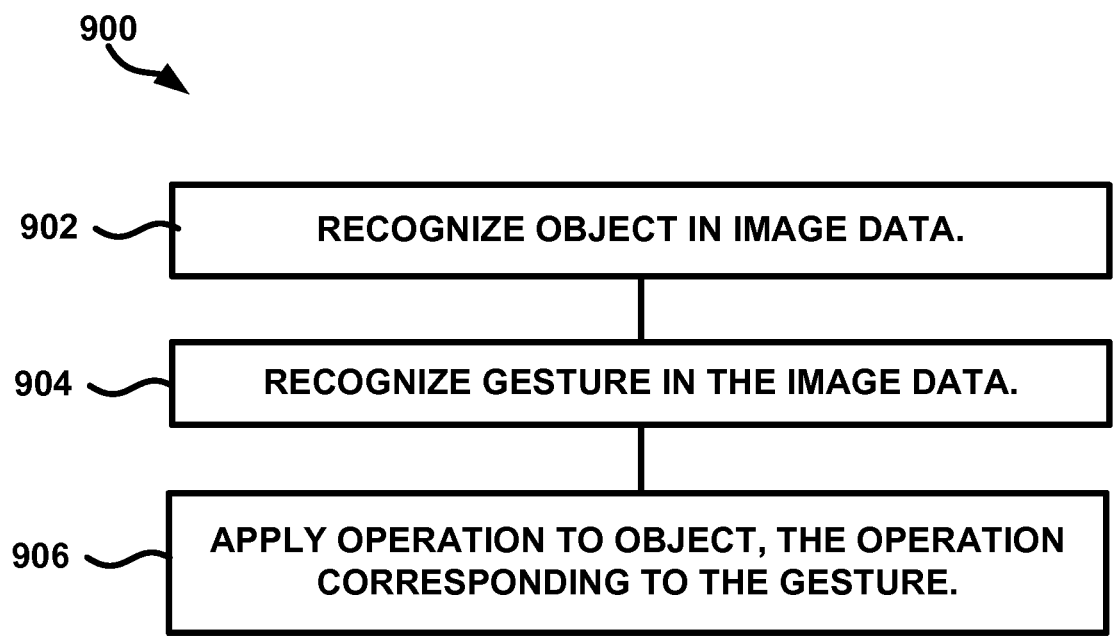
FIG. 9 shows a flow diagram of an example of a method for providing an AR image, in accord with one or more embodiments.

FIG. 9 shows a flow diagram of an example of a method 900 for providing an augmented reality image, in accord with one or more embodiments. The method may be implemented using one or more of the camera module 102, input 202, object recognition module 104 or 204, gesture recognition module 106 or 206, image rendering module 108 or 208, output module 110, wearable display 210, speech recognition module 112, context module 116 or 216, authentication module 118 or 218, the recognition coordination module 222, or AR module 224. The method 900 as illustrated includes: recognizing an object in image data, at operation 902; recognizing a gesture in the image data, at operation 904; and applying an operation corresponding to the gesture to the object, at operation 906. The method 900 may include determining a social circumstance of a user. The operation at 906 may include applying different operations for different social circumstances.

Figure 10:
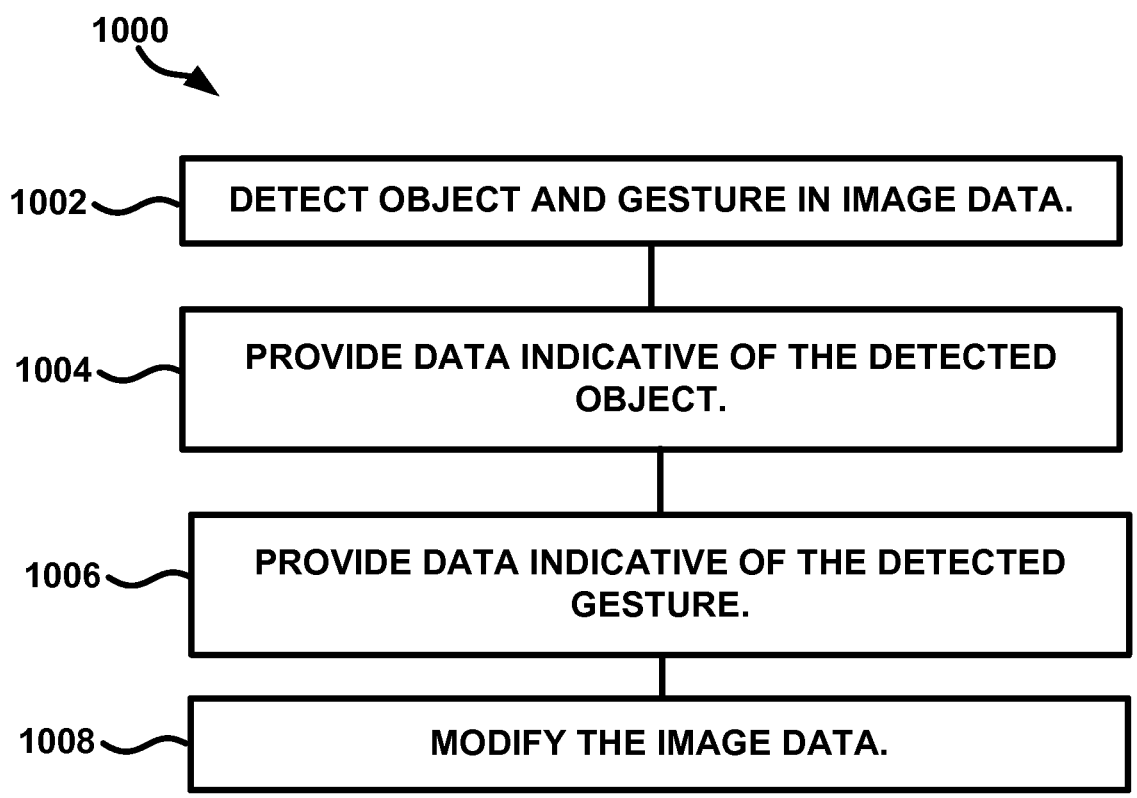
FIG. 10 shows a flow diagram of an example of another method for providing an AR image, in accord with one or more embodiments.

FIG. 10 shows a flow diagram of an example of another method 1000 for providing an augmented reality image, in accord with one or more embodiments. The method may be implemented using one or more hardware processors or one or more of the camera module 102, input 202, object recognition module 104 or 204, gesture recognition module 106 or 206, image rendering module 108 or 208, output module 110, wearable display 210, speech recognition module 112, context module 116 or 216, authentication module 118 or 218, the recognition coordination module 222, or AR module 224. The method 1000 as illustrated includes: detecting an object and a gesture in image data, at operation 1002; providing data indicative of the detected object, at operation 1004; providing data indicative of the detected gesture, at operation 1006; and modifying the image data, at operation 1008. The operation at 1004 may be performed in response to detecting the object in the image data. The operation at 1006 may be performed in response to detecting the gesture in the image data. The operation at 1008 may include modifying the image data using the data indicative of the detected object and the data indicative of the detected gesture.

The method 1000 may include extracting one or more fingers from other image data and providing data indicative of the extracted one or more fingers. The method 1000 may include displaying a still image including the detected object with the extracted one or more fingers overlaid on the still image. The operation at 1008 may augmenting the image data with a list of one or more user-selectable operations, which when selected by a user cause the selected operation to be performed on the image data. The operation at 1008 may include modifying the image data to include a plurality of targets and the operations further comprise determining whether the detected object touches one or more targets of the plurality of targets in a specified order, and in response to determining the detected object has touched the one or more targets in the specified order, providing data indicating a valid authentication procedure has been performed.

The operation at 1008 may include modifying the image data by performing a first operation in response to detecting a first object and modify the image data by performing a second, different operation in response to detecting a second, different object. The method 1000 may include associating a sound captured by a microphone with the recognized object by augmenting the image data with text representing the sound proximate to the detected object. The operation at 1008 may include determining a social circumstance of the user using at least one of a location, speed, or direction of the user, and one or more objects in the image data. The operation at 1008 may include modifying the image data by performing a first operation on the image data in response to determining the social circumstance is a first social circumstance and performing a second, different operation on the image data in response to determining the social circumstance is a second, different social circumstance.

AR, as discussed herein, may be performed in real time or near real time. Examples and embodiments, discussed herein demonstrate how the camera may capture the immediate environment and also capture a finger, hand, or object to be used a pointing device on an image of the immediate environment, such as in the same image frame(s).

One or more of the embodiments discussed herein may include an advantage over a prior AR or identification system, device, or method. For example on-the-fly training for recognizing new people is a difficult machine learning problem. However, using an embodiment discussed herein a user may gesture to a person or object in a camera frame and use voice input or another input method to associate a name with the face or object identified with the gesture. The analytical algorithms may then associate the name with the face or object to train a recognition model that may be used for various personal usages. Considering that there may be multiple strangers in a given camera frame this method may reduce the on-the-fly training complexity. For example, a user may set up a meeting with a person by saying "set up a meeting with xyz". In another example, a user may use the system as a memory of past events, such as by asking "when did I last meet xyz?". In another example, a contacts list may be populated using the names associated with the faces and voice commands. For example, a user may visit a person's house and say "X lives here". The system may record the address associated with the location of the user in a contacts list under the name X. Other contact information for a person may enter through verbal commands.

Another advantage may include simplifying or enabling various objects and sub-activities in an activity recognition task that may be identified on-the-fly, enabling easier modelling of complex activities. For example, in a cooking activity a user may gesture toward various objects (pots/pans/spices etc.) and voice label them. This process may reduce the complexity of a cooking activity model builder. This model may then be used for recipe guidance as well as user activity tracking.

Another advantage may include providing more accurate or reliable recommendations to a user. By tagging objects as things of interest to the user the user may be capturing the content for later analysis. Different gestures with or without voice may be used as tags associated with the image data, so when subsequent analysis is done, these are recognized as objects or scenes of interest with some distinct meaning like "remember this", "find this object for me", "what is this?", etc. Alternatively, gestures (e.g., thumbs up or thumbs down) with or without voice may also be used to change the context in a video as "uninteresting" or "interesting". These sorts of tags may be used to determine content of interest to the user.

Figure 11:
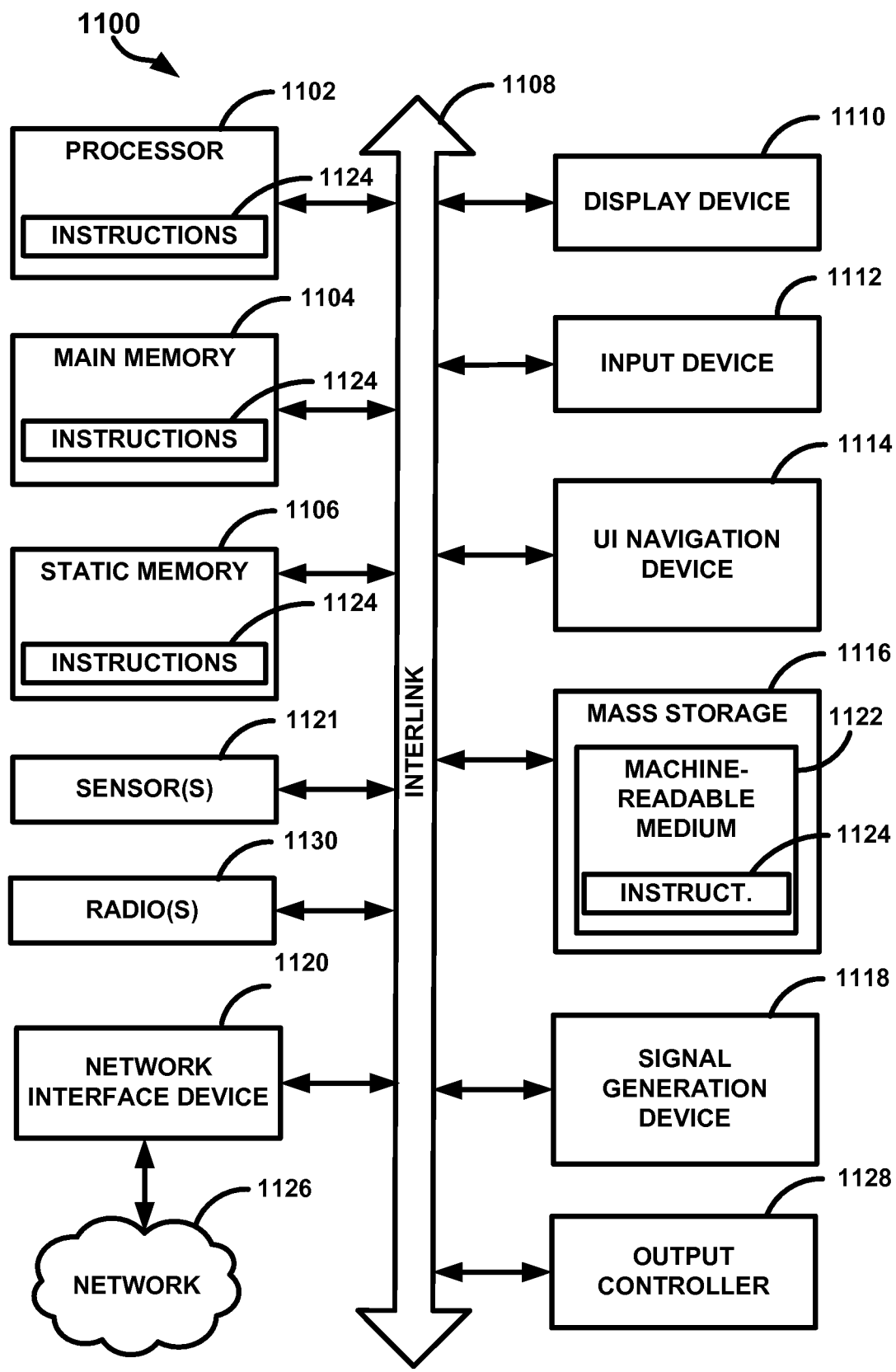
FIG. 11 shows a block diagram of an example of a device upon which any of one or more techniques (e.g., methods) discussed herein may be performed.

FIG. 11 shows a block diagram of an example of a computing device 1100, in accord with one or more embodiments. The device 1100 (e.g., a machine) may operate so as to perform one or more of the programming or communication techniques (e.g., methodologies) discussed herein. In some examples, the device 1100 may operate as a standalone device or may be connected (e.g., networked) to one or more modules, such as the camera module 102, input 202, object recognition module 104 or 204, gesture recognition module 106 or 206, image rendering module 108 or 208, output module 110, wearable display 210, speech recognition module 112, context module 116 or 216, authentication module 118 or 218, the recognition coordination module 222, or AR module 224. In other examples, the one or more items of the device 1100 may be a part of the camera module 102, input 202, object recognition module 104 or 204, gesture recognition module 106 or 206, image rendering module 108 or 208, output module 110, wearable display 210, speech recognition module 112, context module 116 or 216, authentication module 118 or 218, the recognition coordination module 222, or AR module 224, as discussed herein.

Embodiments, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively may be coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Device (e.g., computer system) 1100 may include a hardware processor 1102 (e.g., a central processing unit (CPU), a graphics processing unit (GPU), a hardware processor core, or any combination thereof), a main memory 1104 and a static memory 1106, some or all of which may communicate with each other via an interlink (e.g., bus) 1108. The device 1100 may further include a display unit 1110, an input device 1112 (e.g., an alphanumeric keyboard), and a user interface (UI) navigation device 1114 (e.g., a mouse). In an example, the display unit 1110, input device 1112 and UI navigation device 1114 may be a touch screen display. The device 1100 may additionally include a storage device (e.g., drive unit) 1116, a signal generation device 1118 (e.g., a speaker), a network interface device 1120, and one or more sensors 1121, such as a global positioning system (GPS) sensor, compass, accelerometer, or other sensor. The device 1100 may include an output controller 1128, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). The device 1100 may include one or more radios 1130 (e.g., transmission, reception, or transceiver devices). The radios 1130 may include one or more antennas to receive signal transmissions. The radios 1130 may be coupled to or include the processor 1102. The processor 1102 may cause the radios 1130 to perform one or more transmit or receive operations. Coupling the radios 1130 to such a processor may be considered configuring the radio 1130 to perform such operations. In general, an item being "caused" to perform an operation includes the item receiving data, interpreting the data as a command to perform an operation, and performing the operation. The signal does not have to be issued by the item that is causing the other item to perform the operation. Generally, "a first item causing a second item to perform an operation" means that the first item provided data that is already properly formatted to communicate with the second item or needs formatting and eventually becomes data that the second item receives and interprets as a command to perform the operation.

The storage device 1116 may include a machine readable medium 1122 on which is stored one or more sets of data structures or instructions 1124 (e.g., software) embodying or utilized by any one or more of the techniques or functions described herein. The instructions 1124 may also reside, completely or at least partially, within the main memory 1104, within static memory 1106, or within the hardware processor 1102 during execution thereof by the device 1100. In an example, one or any combination of the hardware processor 1102, the main memory 1104, the static memory 1106, or the storage device 1116 may constitute machine readable media.

While the machine readable medium 1122 is illustrated as a single medium, the term "machine readable medium" may include a single medium or multiple media (e.g., a centralized or distributed database, and/or associated caches and servers) configured to store the one or more instructions 1124. The term "machine readable medium" may include any tangible medium that is capable of storing, encoding, or carrying instructions for execution by the device 1100 and that cause the device 1100 to perform any one or more of the techniques of the present disclosure, or that is capable of storing, encoding or carrying data structures used by or associated with such instructions. The term "machine-readable medium" shall accordingly be taken to include, but not be limited to, solid-state memories, and optical and magnetic media. Specific examples of machine-readable media may include: non-volatile memory, such as semiconductor memory devices (e.g., Electrically Programmable Read- Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1124 may further be transmitted or received over a communications network 1126 using a transmission medium via the network interface device 1120 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1120 may include one or more physical jacks (e.g., Ethernet, coaxial, or phone jacks) or one or more antennas to connect to the communications network 1126. In an example, the network interface device 1120 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the device 1100, and includes digital or analog communications signals or other intangible medium to facilitate communication of such software.

Examples and Notes

The present subject matter may be described by way of several examples.

Example 1 may include or use subject matter (such as an apparatus, a method, a means for performing acts, or a device readable memory including instructions that, when performed by the device, may cause the device to perform acts), such as may include or use a camera module to capture image data, an object recognition module to analyze the image data to recognize an object, and in response to recognizing the object, to provide data indicative of the recognized object, a gesture recognition module to analyze the image data to recognize a gesture, and in response to recognizing the gesture, to provide data indicative of the recognized gesture, or an output device to perform an operation using the data indicative of the recognized object and the data indicative of the recognized gesture.

Example 2 may include or use, or may optionally be combined with the subject matter of Example 1, to include or use, wherein the object recognition module is further to extract data indicative of one or more fingers from other image data captured by the camera and provide the data indicative of the one or more fingers or wherein the device comprises an image rendering module to modify the image data using the data indicative of the recognized object and the data indicative of the recognized gesture, and wherein the image rendering module is further to cause the output device to display a still image including the recognized object with the extracted one or more fingers overlaid on the still image using the data indicative of the one or more fingers.

Example 3 may include or use, or may optionally be combined with the subject matter of Example 2, to include or use, wherein the image rendering module is to modify the image data with a list of one or more user-selectable operations, which when selected, cause the image rendering module to modify the image data using a selected operation.

Example 4 may include or use, or may optionally be combined with the subject matter of at least one of Examples 2-3, to include or use, wherein the image rendering module is to modify the image data by performing a first operation in response to the object recognition module determining the recognized object is a first object, and wherein the image rendering module is to modify the image data by performing a second operation, different from the first operation, in response to the object recognition module determining the recognized object is a second object, different from the first object.

Example 5 may include or use, or may optionally be combined with the subject matter of at least one of Examples 2-4, to include or use a context module to determine a social circumstance of the user based on at least one of a location, speed, or direction of the user, one or more people in the image data, one or more objects in the image data, and an application state of an application running on the device. Example 5 can optionally include or use, wherein the image rendering module is to modify the image by performing a first operation on the image data based on the social circumstance being a first social circumstance and performing a second, different operation on the image data based on the social circumstance being a second social circumstance, different from the first social circumstance.

Example 6 may include or use, or may optionally be combined with the subject matter of at least one of Examples 1-5, to include or use, wherein the device further comprises an authentication module to receive the data indicative of the recognized gesture to determine whether the recognized gesture satisfies a policy including one or more gestures that must be performed before a user is allowed access to the functionality of the device, and in response to determining the policy has been satisfied, provide data indicating a valid authentication procedure has been performed.

Example 7 may include or use, or may optionally be combined with the subject matter of at least one of Examples 1-6, to include or use a microphone and a speech recognition module, wherein the speech recognition module is to translate a sound captured by the microphone and provide data indicative of the translated sound that causes the output device to perform the operation using the translated sound.

Example 8 may include or use, or may optionally be combined with the subject matter of at least one of Examples 1-7, to include or use, wherein the device is head-mountable and the output module includes a display.

Example 9 may include or use, or may optionally be combined with the subject matter of Example 8, to include or use, wherein the display is mounted so that a user wearing the device views the display and performs a gesture between the display and an object the gesture is directed to.

Example 10 may include or use, or may optionally be combined with the subject matter of Example 2, to include or use, wherein extracting the data indicative of the object includes isolating pixels corresponding to the object so as to delineate the object from the surrounding environment.

Example 11 may include or use, or may optionally be combined with the subject matter of Example 5, to include or use, wherein the social circumstances includes at least one of a user exercising, conversing, driving, shopping, eating, watching a program, working, and visiting a person, place, or thing.

Example 12 may include or use, or may optionally be combined with the subject matter of Example, to include or use, wherein the gesture includes pointing towards the object with a finger and wherein the device comprises an image rendering module to associate a sound spoken into the microphone with the object that is pointed to.

Example 13 may include or use, or may optionally be combined with the subject matter of Example 12, to include or use, wherein the object recognition module is to associate the sound with the object in response to recognizing the object in the image data another time.

Example 14 may include or use, or may optionally be combined with the subject matter of at least one of Examples 12-13, to include or use a context module to determine a social circumstance of the user, and an image rendering module to modify the image data, wherein the image rendering module is to modify the image data with text representative of the sound in response to the context module determining the social circumstance and wherein the image rendering module does not modify the image data to include text representative of the sound in response to the context module determining the social circumstance is a second circumstance different from the first social circumstance.

Example 15 may include or use, or may optionally be combined with the subject matter of at least one of Examples 1-14, to include or use, wherein the object recognition module is to recognize multiple objects in the image data and the gesture recognition module is to provide data indicative of a gesture that causes the image rendering module to perform an operation on two or more of the multiple recognized objects.

Example 16 may include or use, or may optionally be combined with the subject matter of at least one of Examples 1-15, to include or use, wherein the gesture recognized by the gesture recognition module includes at least one of a sweeping motion, one or more fingers configured in a specific shape, increasing or decreasing a distance between two fingers, pointing with one or more fingers, performing a tapping motion with one or more fingers, or a combination thereof.

Example 17 may include or use, or may optionally be combined with the subject matter of Example 2, to include or use, wherein the gesture recognition module is to recognize a further gesture and provide further data indicative of the further gesture and wherein the image rendering module is to modify image data of the still image using the further data indicative of the further gesture.

Example 18 may include or use, or may optionally be combined with the subject matter of at least one of Examples 1-17, to include or use, wherein the gesture causes the output module to access information relevant to purchasing a product associated with the object and present the information to the user.

Example 19 may include or use subject matter (such as an apparatus, a method, a means for performing acts, or a device readable memory including instructions that, when performed by the device, may cause the device to perform acts), such as may include or use detecting, in image data, an object and a gesture, in response to detecting the object in the image data, providing data indicative of the detected object, in response to detecting the gesture in the image data, providing data indicative of the detected gesture, or modifying the image data using the data indicative of the detected object and the data indicative of the detected gesture.

Example 20 may include or use, or may optionally be combined with the subject matter of Example 19, to include or use extracting one or more fingers from other image data and providing data indicative of the extracted one or more fingers, or displaying a still image including the detected object with the extracted one or more fingers overlaid on the still image.

Example 21 may include or use, or may optionally be combined with the subject matter of at least one of Examples 19-20, to include or use, wherein modifying the image data based on the data indicative of the detected object and the data indicative of the detected gesture includes augmenting the image data with a list of one or more user-selectable operations, which when selected by a user, cause the selected operation to be performed on the image data.

Example 22 may include or use, or may optionally be combined with the subject matter of at least one of Examples 19-21, to include or use, wherein modifying the image data based on the data indicative of the detected object and the data indicative of the detected gesture includes modifying the image data to include a plurality of targets and the operations further comprise determining whether the detected object virtually touches one or more targets of the plurality of targets in a specified order, and in response to determining the detected object has virtually touched the one or more targets in the specified order, providing data indicative of a valid authentication procedure being performed.

Example 23 may include or use, or may optionally be combined with the subject matter of at least one of Examples 19-22, to include or use, wherein modifying the image data based on the data indicative of the detected object and the data indicative of the detected gesture includes modifying the image data by performing a first operation in response to detecting a first object and modifying the image data by performing a second, different operation in response to detecting a second, different object.

Example 24 may include or use, or may optionally be combined with the subject matter of at least one of Examples 19-23, to include or use associating a sound captured by a microphone with the recognized object by augmenting the image data with text representing the sound proximate to the detected object.

Example 25 may include or use, or may optionally be combined with the subject matter of at least one of Examples 19-24, to include or use determining a social circumstance of the user based on at least one of a location, speed, or direction of the user, and one or more objects in the image data, and wherein modifying the image data based on the data indicative of the detected object and the data indicative of the detected gesture includes modifying the image data by performing a first operation on the image data in response to determining the social circumstance is a first social circumstance and performing a second, different operation on the image data in response to determining the social circumstance is a second, different social circumstance.

Example 26 may include or use, or may optionally be combined with the subject matter of Example 20, to include or use, wherein extracting the data indicative of the object includes isolating pixels corresponding to the object so as to delineate the object from the surrounding environment.

Example 27 may include or use, or may optionally be combined with the subject matter of Example 25, to include or use, wherein the first and second social circumstance includes at least one of a user exercising, conversing, driving, shopping, eating, watching a program, working, and visiting a person, place, or thing.

Example 28 may include or use, or may optionally be combined with the subject matter of Example 24, to include or use, wherein the gesture includes pointing towards the object with a finger and associating a sound spoken into the microphone with the object that is pointed to.

Example 29 may include or use, or may optionally be combined with the subject matter of Example 28, to include or use associating the sound with the object in response to recognizing the object in the image data another time.

Example 30 may include or use, or may optionally be combined with the subject matter of at least one of Examples 28-29, to include or use determining a social circumstance of the user, and modifying the image data with text representative of the sound in response to determining the social circumstance, and not modifying the image data to include text representative of the sound in response to determining the social circumstance is a second circumstance different from the first social circumstance.

Example 31 may include or use, or may optionally be combined with the subject matter of at least one of Examples 19-30, to include or use, wherein recognizing an object includes recognizing multiple objects in the image data and wherein providing data indicative of the gesture includes providing data that causes an operation to be performed on two or more of the multiple recognized objects.

Example 32 may include or use, or may optionally be combined with the subject matter of at least one of Examples 19-31, to include or use, wherein the gesture includes at least one of a sweeping motion, one or more fingers configured in a specific shape, increasing or decreasing a distance between two fingers, pointing with one or more fingers, performing a tapping motion with one or more fingers, or a combination thereof.

Example 33 may include or use, or may optionally be combined with the subject matter of Example 20, to include or use recognizing a further gesture and providing further data indicative of the further gesture, and wherein modifying the image data includes modifying the still image using the further data indicative of the further gesture.

Example 34 may include or use, or may optionally be combined with the subject matter of at least one of Examples 19-33, to include or use, wherein the gesture causes information relevant to purchasing a product associated with the object to be accessed and presented to the user.

Example 35 may include or use, or may optionally be combined with the subject matter of at least one of Examples 19-34, to include or use a machine-readable medium including instructions, which when executed by a machine, cause the machine to perform operations of any of the methods of Examples 19-34.

Example 36 may include or use, or may optionally be combined with the subject matter of at least one of Examples 19-34, to include or use an apparatus comprising means for performing any of the methods of Examples 19-34.

Example 19 may include or use subject matter (such as an apparatus, a method, a means for performing acts, or a device readable memory including instructions that, when performed by the device, may cause the device to perform acts), such as may include or use means for detecting, in image data, an object and a gesture, means for, in response to detecting the object in the image data, providing data indicative of the detected object, means for, in response to detecting the gesture in the image data, providing data indicative of the detected gesture, or means for modifying the image data using the data indicative of the detected object and the data indicative of the detected gesture.

The above Description of Embodiments includes references to the accompanying drawings, which form a part of the detailed description. The drawings show, by way of illustration, specific embodiments in which methods, apparatuses, and systems discussed herein may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

The flowchart and block diagrams in the FIGS. illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The functions or techniques described herein may be implemented in software or a combination of software and human implemented procedures. The software may consist of computer executable instructions stored on computer readable media such as memory or other type of storage devices. The term "computer readable media" is also used to represent any means by which the computer readable instructions may be received by the computer, such as by different forms of wired or wireless transmissions. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Description of Embodiments, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Description of Embodiments as examples or embodiments, with each claim standing on its own as a separate embodiment, and it is contemplated that such embodiments may be combined with each other in various combinations or permutations. The scope of the invention should be determined with reference to the appended claims, along with the full scope of equivalents to which such claims are entitled.

What is claimed is:

1. A device comprising:
   a camera to capture image data including video;
   a display to provide a view of the video captured by the camera;
   an object recognition module including circuitry to analyze the image data to recognize a first object and one or more fingers in the video, and in response to recognizing the first object, to provide data indicative of the recognized first object and in response to recognizing the one or more fingers, to extract data corresponding to the one or more fingers from the video;
   a gesture recognition module including circuitry to analyze the video to recognize a first gesture performed by the recognized one or more fingers, and in response to recognizing the first gesture, to provide data indicative of the first recognized gesture;
   wherein the object recognition module, in response to the data indicative of the first recognized gesture, is further to issue a command to circuitry of an image rendering module that causes the image rendering module to render a still image including the first object;
   wherein the camera is to continue to capture second video while the display is providing the view of the still image;
   wherein the object recognition module is to, while the display is providing the view of the till image, extract data corresponding to the one or more fingers from the second video;
   the image rendering module including circuitry to modify the still image to include the extracted one or more fingers from the second video overlaid on the still image, to alter pixel values of or around the first object in the still image, and to augment the first object based on data indicative of a second recognized gesture; and
   wherein the image rendering module is further to cause the display to provide a view of the modified still image including the augmented first object with the extracted one or more fingers from the second video overlaid thereon.

2. The device of claim 1, wherein the image rendering module is to modify the still image with a list of one or more user-selectable operations, which when selected, cause the image rendering module to modify the image data using a selected operation.

3. The device of claim 1, wherein, in response to the gesture recognition module recognizing the second gesture, the image rendering module is to modify the image data by performing a first operation in response to the object recognition module determining a recognized object is the first object, and wherein, in response to the gesture recognition module recognizing the same second gesture, the image rendering module is to modify the image data by performing a second operation, different from the first operation, in response to the object recognition module determining a recognized object is the second object, different from the first object.

4. The device of claim 1, further comprising:
   a microphone to capture sounds;
   a speech recognition module including circuitry to translate one or more sounds captured by the microphone and provide data indicative of the translated one or more sounds;
   a context module including circuitry to determine one or more social circumstances of the user based on a location, a speed of the user, a translated sound, one or more objects in the image data, and one or more people in the image data, wherein a social circumstance is one of a plurality of social circumstances including the user of the device exercising, conversing, driving, shopping, eating, and working;
   wherein the image rendering module is to modify the image by performing a first operation on the image data based on a first social circumstance of the one or more social circumstances determined by the context module, and the second gesture recognized by the gesture recognition module; and
   wherein the image rendering module is to modify the image by performing a second, different operation on the image data based on a second social circumstance of the one or more social circumstances determined by the context module, different from the first social circumstance, and a third gesture recognized by the gesture recognition module.

5. The device of claim 4, wherein the device further comprises an authentication module including circuitry to receive the data indicative of the first recognized gesture to determine whether the first recognized gesture satisfies a policy including one or more gestures that must be performed before a user is allowed access to the functionality of the device, and in response to determining the policy has been satisfied, provide data indicating a valid authentication procedure has been performed.

6. The device of claim 5, further comprising;
   an output module including a speaker to output audio;
   wherein the authentication module is further to, in response to determining the recognized first gesture does not satisfy the policy, provide data indicating the authentication procedure has failed;
   wherein the output module is to, in response to receiving data indicating the authentication procedure has failed, output a series of security questions to a user;
   a speech recognition module includes circuitry to receive answers to the security questions from the user, and provide data indicative of the answers from the user; and wherein the authentication module is to determine whether the policy has been satisfied based on the data indicative of the answers from the user.

7. The device of claim 1, comprising a microphone and a speech recognition module, wherein the speech recognition module includes circuitry to translate a sound captured by the microphone and provide data indicative of the translated sound that causes the output device to perform the operation using the translated sound.

8. A method comprising operations performed using a hardware processor, the operations comprising:
capturing, by a camera, image data including video,
displaying, by a display, a view of the video;
detecting, by circuitry of an object recognition module, in the video, a first object and one or more fingers;
extracting, by the circuitry of the object recognition module, the detected first object and the one or more fingers from the video;
displaying, by the display, the extracted one or more fingers overlaid on the video;
detecting, by circuitry of a gesture recognition module, a gesture performed by the one or more extracted one or more fingers;
issuing, by the circuitry of the object recognition module, a command to circuitry of an image rendering module that causes the image rendering module to render a still image including the first object, capturing, by the camera, second video while the display is providing the view of the still image;
while the display is providing the view of the still image, extracting, by the circuitry of the object recognition module, data corresponding to the one or more fingers from the second video;
modifying, by circuitry of an image rendering module, the still image to include the extracted one or more fingers from the second video overlaid on the still image;
altering pixel values of or around the first object in the still image, and augmenting the first object based on data indicative of a second recognized gesture; and
displaying the modified still image including the augmented first object, with the extracted one or more fingers overlaid on the modified still image.

9. The method of claim 8, wherein modifying the still image includes augmenting the still image with a list of one or more user-selectable operations, which when selected by a user, cause the selected operation to be performed on the image data.

10. The method of claim 8, wherein modifying the still image includes modifying the still image to include a plurality of targets and the operations further comprise determining whether the detected first object virtually touches one or more targets of the plurality of targets in a specified order, and in response to determining the detected first object has virtually touched the one or more targets in the specified order, providing data indicative of a valid authentication procedure being performed.

11. The method of claim 8, wherein modifying the still image includes modifying the still image by performing a first operation in response to detecting the first object and modifying the still image by performing a second, different operation in response to detecting a second, different object.

12. The method of claim 8, further comprising associating a sound captured by a microphone with the detected first object by augmenting the image data with text representing the sound proximate to the detected first object.

13. The method of claim 8, further comprising:
detecting one or more sounds using a microphone;
in response to detecting one or more sounds, translating the one or more sounds and providing data indicative of the translated one or more sounds;
determining one or more social circumstances of the user based on a location, a speed of the user, data indicative of the translated one or more sounds, the detected first object, and one or more people in the video, wherein a social circumstance is one of a plurality of social circumstances including the user of the device exercising, conversing, driving, shopping, eating, and working;
modifying the image data by performing a first operation on the image data based upon a first social circumstance of the determined one or more social circumstances and the second gesture, and
modifying the image data by performing a second, different operation on the image data based upon a second social circumstance of the determined one or more social circumstances and a third gesture, wherein the second social circumstance is different from the first social circumstance.

14. The method of claim 8, wherein detecting the first object includes using one or more of edge matching, color matching, and gradient matching.

15. At least one non-transitory machine-readable medium comprising instructions, when performed by a machine, cause the machine to:
capture image data including video;
display the video,
detect, in the video, a first object and one or more fingers;
extract the detected first object and the one or more fingers from the video;
display the extracted one or more fingers overlaid on the video;
detect a gesture performed by the extracted one or more fingers in the video;
render a still image including the first object,
capture second video while displaying the view of the still image;
while the display is providing the view of the still image, extract data corresponding to the one or more fingers from the second video;
modify the still image to include the extracted one or more fingers from the second video overlaid on the still image;
alter pixel values of or around the first object in the still image, and augment the first object based on data indicative of a second recognized gesture; and
display the modified still image including the augmented first object, with the extracted one or more fingers overlaid on the modified still image.

16. The machine-readable medium of claim 15, wherein the instructions for modifying the still image include instructions, when performed by the machine, cause the machine to augment the image data with a list of one or more user-selectable operations, which when selected by a user, cause a selected operation to be performed on the image data.

17. The machine-readable medium of claim 15, wherein the instructions for modifying the still image include instructions, when performed by the machine, cause the machine to modify the image data to include a plurality of targets and the operations further comprise determining whether the detected first object virtually touches one or more targets of the plurality of targets in a specified order, and in response to determining the detected first object has virtually touched the one or more targets in the specified order, provide data indicative of a valid authentication procedure being performed.

18. The machine-readable medium of claim 15, wherein the instructions for modifying the still image include instructions, when performed by the machine, cause the machine to modify the image data by performing a first operation in response to detecting the first object, and modifying the image data by performing a second operation different, from the first operation in response to detecting a second object different from the first object.

19. The machine-readable medium of claim 15, further comprising instructions, when performed by the machine, cause the machine to:
   detect one or more sounds using a microphone;
   in response to detecting one or more sounds, translate the one or more sounds and provide data indicative of the translated one or more sounds;
   determine one or more social circumstances of the user based on a location, a speed of the user, data indicative of the translated one or more sounds, the detected first object, and one or more people in the image data, wherein a social circumstance is one of a plurality of social circumstances including the user of the device exercising, conversing, driving, shopping, eating, and working;
   modify the image data by performing a first operation on the image data based upon a first social circumstance and the second recognized gesture; and
   modify the image data by performing a second, different operation on the image data based upon a second social circumstance and a third recognized gesture, wherein the second social circumstance is different from the first social circumstance.

20. The machine-readable medium of claim 15, wherein the instructions to augment the detected first object include instructions when performed by the machine, cause the machine to label the detected first object with a name.

* * * * *